C. McBURNEY.
BLANKETS FOR CALICO PRINTING.
No. 189,868. Patented April 24, 1877.
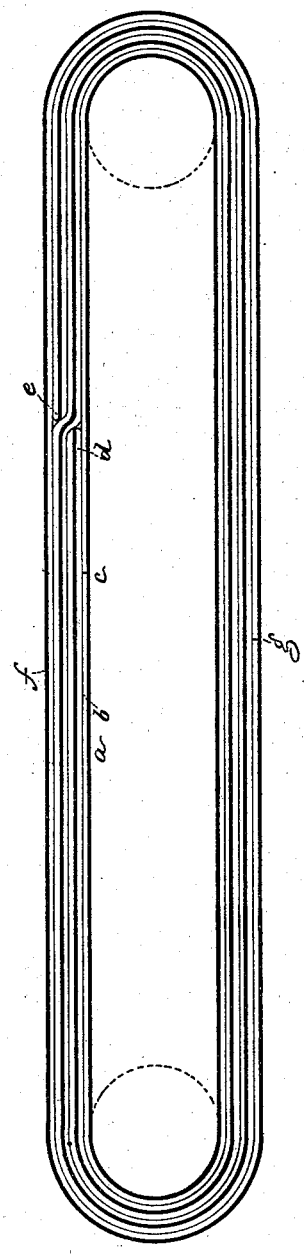
Witnesses.
L. H. Latimer,
W. J. Pratt
Inventor
Charles McBurney
per Crosby & Gregory
Attys

UNITED STATES PATENT OFFICE.

CHARLES McBURNEY, OF BOSTON, MASSACHUSETTS.

IMPROVEMENT IN BLANKETS FOR CALICO-PRINTING.

Specification forming part of Letters Patent No. 189,868, dated April 24, 1877; application filed April 7, 1876.

*To all whom it may concern:*

Be it known that I, CHARLES McBURNEY, of Boston, in the county of Suffolk and State of Massachusetts, have invented an Improvement in Blankets for Calico-Printing, of which the following is a specification:

This invention relates to endless aprons or blankets for use on calico and fabric printing-machines; and consists in an india-rubber blanket, made substantially as hereafter described, as a new article of manufacture, and in the process of making the same.

A blanket made of thick-woven material, spliced to make it endless, is objectionable, because the spliced portion frequently gives out before the main portion of the blanket is sufficiently worn to become unserviceable; and other blankets having a coarse, rough, woolen surface, besides being very expensive, are not adapted to print small or fine patterns.

Blankets known to some extent among calico-printers as the "Mackintosh blanket," are made from a single piece of cotton cloth, lapped or wound, so as to form an endless blanket of, usually, four thicknesses of cloth, the layers of which are united together by an india-rubber cement, composed of rubber softened in naphtha or camphene. The blanket so formed and united is not vulcanized, is fragile, and easily injured in handling, and fails to possess the elasticity necessary to the production of a blanket suited to the requirements of the calico-printer; and, further, the rubber cement soon grows hard, the plies of the cotton, often subjected to pressure in the printing operation, soon become consolidated, and the blanket thereafter fails to present the proper amount of elasticity. In these blankets, united by rubber cement, it will be obvious that the rubber cement, introduced merely as a uniting means between the plies, will be thin and of a thickness less than that of the cloth, and it does not, therefore, add materially, if at all, to the elasticity of the blanket.

A blanket, as just above described, depends for its elasticity upon the cotton cloth united under tension, and it will be apparent that a piece of cotton cloth has but little elasticity as compared with vulcanized rubber, and has but a limited power or ability to resume after pressure its shape before pressure, and as such a blanket, composed merely of cotton, is subjected to pressure in printing, it rapidly deteriorates, and soon becomes worthless, seldom lasting longer than to permit the printing of ten to fourteen thousand pieces of goods.

A blanket for calico-printing, to be most effective, must possess a perfectly smooth and even fibrous surface, and the blanket, each time it is subjected to pressure, must be capable of restoring itself by reason of its own elasticity to its original condition before pressure.

My improved endless blanket presents a cotton face and back, the same as to smoothness as the Mackintosh blanket, but differs from such blanket in all other particulars. The cloth from which my endless blanket is made is first coated or covered with a sheet of vulcanizable india-rubber of the purest and best quality, and the rubber is rolled and spread on the cloth with the machinery now used for such purpose; but care must be taken that the machinery is perfect and applies the rolled sheet of gum of uniform thickness at every point, or else the endless blanket will be of not uniform thickness, and consequently unserviceable.

I preferably mix the purest and best gum with white lead and sulphur, as in the process of vulcanization. This compound will vulcanize at a less degree of heat than if zinc were used, and the cotton fiber will be less heated; but I may use zinc instead of white lead. Some of this cloth is covered with the sheet of gum on one side, and some of it is covered on both sides, the thickness of the sheet of gum when the endless blanket is vulcanized being, for the best results, always much thicker than the thickness of the cloth, for in my blanket the elasticity comes from the vulcanized rubber between the layers of cloth, the latter giving strength to the endless belt, and preventing it from becoming strained or stretched in the direction of its length or breadth, and presenting the smooth working faces.

A piece of this cotton cloth, *a*, coated on one side with gum, as at *b*, and of a length sufficient, when its ends are abutted, to form an endless blanket of the desired length, is placed about two cylinders or rollers separated the proper distance, the rollers being situated with reference to this piece of cloth, as indicated in dotted lines, within the endless blanket, and the ends of this piece are abutted, as at $c$, against the rubber face of a second strip of cloth, $d$, coated with a rubber sheet on both its sides, and this piece $d$ is wound, preferably, twice about the foundation-piece $a\ b$, according to the thickness of the blanket desired, and its end is made to terminate at $e$ to form a seam of equal thickness, and then the piece $d$ is covered with a third piece, $f$, coated on one side only with gum, and the ends of this piece are abutted at $g$ against the rubber face of piece $d$, making an endless blanket of even thickness and of uniform elasticity throughout its length.

The cloth is shown in the drawing by the heavy black lines, and the sheet of vulcanizable gum by the white space between the cloth lines, and the fine black lines represent the line of junction of the sheets of gum, each with the face of the other.

In making this endless belt the rollers will be rotated, and the layers of cloth led from a suitable beam or roller, and under proper tension will be laid or conducted evenly and smoothly, one on the other.

After this the blanket is removed to a vulcanizing-chamber, heated preferably by hot air instead of steam, as experience teaches that hot air produces the best results and leaves the blanket in better condition than when vulcanized by the action of steam, for hot air does not impart moisture to the fibrous portions of the blanket, as in the case with steam; but the blanket may be vulcanized with good results in a steam-chamber.

An endless blanket made as above described, in practice is found to produce better work as regards distinctness of printing, and to last long enough to wear out several blankets united by rubber cement, and for these reasons this endless blanket is deemed specially valuable.

I claim—

As a new article of manufacture, an endless blanket for printing-machines, composed of layers of cloth coated on one and on both sides with rolled layers of vulcanizable gum, thicker than the cloth, and arranged with relation to each other, and to present a fibrous face for the outer surface, and vulcanized, all substantially as set forth.

In testimony whereof I have signed my name to this specification in the presence of two subscribing witnesses.

CHARLES McBURNEY.

Witnesses:
G. W. GREGORY,
S. B. KIDDER.